US010764783B2

United States Patent
Agneray

(10) Patent No.: US 10,764,783 B2
(45) Date of Patent: Sep. 1, 2020

(54) METHOD FOR SEGMENTING DATA AT HIGH EFFICIENCY

(71) Applicant: HL2, Futuroscope Chasseneuil (FR)

(72) Inventor: Florent Agneray, Sanxay (FR)

(73) Assignee: HL2, Chasseneuil (FR)

( * ) Notice: Subject to any disclaimer, the term of this patent is extended or adjusted under 35 U.S.C. 154(b) by 0 days.

(21) Appl. No.: 16/310,350

(22) PCT Filed: Jun. 9, 2017

(86) PCT No.: PCT/EP2017/064194
§ 371 (c)(1),
(2) Date: Dec. 14, 2018

(87) PCT Pub. No.: WO2017/216074
PCT Pub. Date: Dec. 21, 2017

(65) Prior Publication Data
US 2019/0191333 A1    Jun. 20, 2019

(30) Foreign Application Priority Data
Jun. 15, 2016 (FR) ...................................... 16 55527

(51) Int. Cl.
*H04W 28/06* (2009.01)
*H04L 12/801* (2013.01)
(Continued)

(52) U.S. Cl.
CPC ........... *H04W 28/065* (2013.01); *H04L 47/34* (2013.01); *H04L 69/22* (2013.01); *H04W 28/14* (2013.01);
(Continued)

(58) Field of Classification Search
CPC ....... H04L 47/34; H04L 69/22; H04L 1/0061; H04W 28/065; H04W 28/14; H04W 80/02; H04W 88/16
See application file for complete search history.

(56) References Cited

U.S. PATENT DOCUMENTS

| 2002/0080888 A1* | 6/2002 | Shu | ..................... G06F 11/1076 |
| | | | 375/295 |
| 2003/0108066 A1* | 6/2003 | Trippe | .................... H04L 47/10 |
| | | | 370/474 |

(Continued)

FOREIGN PATENT DOCUMENTS

| KR | 2011006611 A | * | 7/2010 | | |
| WO | WO-9904521 A2 | * | 1/1999 | ............ | H03M 13/29 |
| WO | WO-2015012645 A1 | * | 1/2015 | ............ | H04L 67/06 |

*Primary Examiner* — Afsar M Qureshi
(74) *Attorney, Agent, or Firm* — Lowenstein Sandler LLP

(57) ABSTRACT

The present disclosure relates to transmitting data sent from at least one connected object to an addressee via a transmission architecture consisting of at least one low-rate network. The method includes encoding the data as messages and dividing each of the messages into a plurality of segments. The method further includes encapsulating each segment in a packet associated with a header to generate a plurality of packets and routing the plurality of packets via base stations in the at least one low-rate network. The method further includes reconstructing each of the messages from the plurality of packets received to generate reconstituted messages and transmitting each reconstituted message to the addressee from a control server. The reconstructing of each of the messages is based on a modulation of sending the plurality of packets of each message at successive time intervals defined by four or less sending periods of specific durations.

13 Claims, 3 Drawing Sheets

Figure 1:
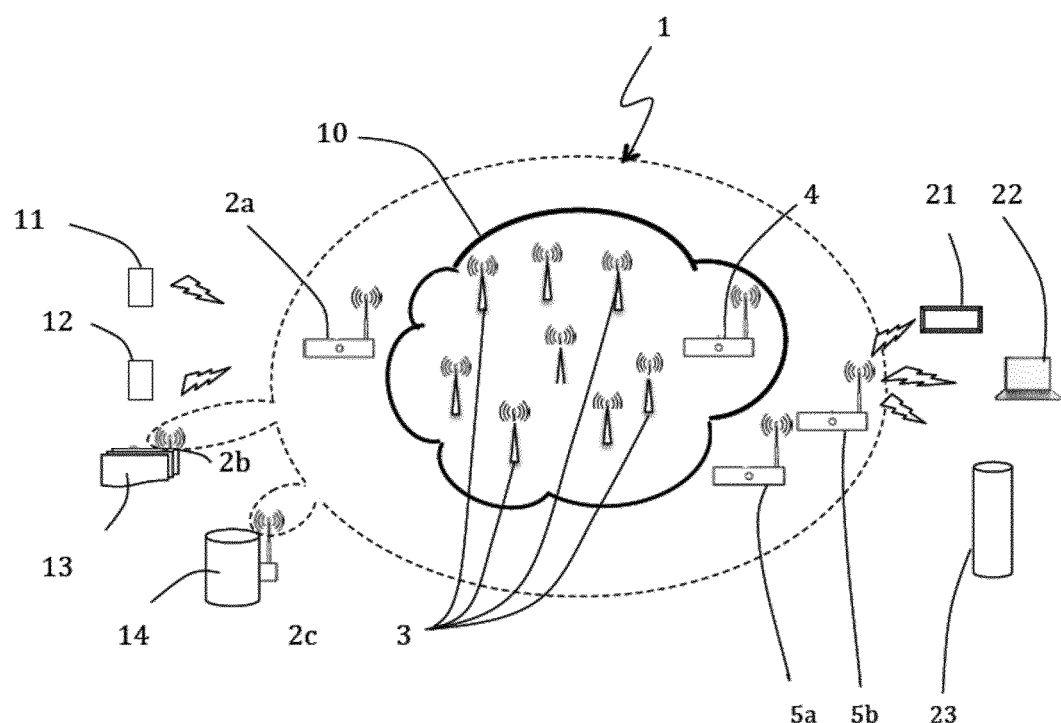

(51) Int. Cl.
*H04L 29/06* (2006.01)
*H04W 28/14* (2009.01)
*H04W 80/02* (2009.01)
*H04L 1/00* (2006.01)
*H04W 88/16* (2009.01)

(52) U.S. Cl.
CPC .......... *H04W 80/02* (2013.01); *H04L 1/0061* (2013.01); *H04W 88/16* (2013.01)

(56) References Cited

U.S. PATENT DOCUMENTS

| | | | | |
|---|---|---|---|---|
| 2012/0196579 A1* | 8/2012 | Souissi | .................. | H04L 25/14 455/414.4 |
| 2012/0331111 A1* | 12/2012 | Wu | .................... | H04W 28/065 709/219 |
| 2016/0066212 A1* | 3/2016 | Visweswara | ........ | H04W 28/065 370/474 |
| 2018/0062797 A1* | 3/2018 | Yang | .................... | H04W 28/14 |

\* cited by examiner

METHOD FOR SEGMENTING DATA AT HIGH EFFICIENCY

RELATED APPLICATIONS

This Application claims the benefit under 35 U.S.C. § 371 of International Patent Application No. PCT/EP2017/064194, filed Jun. 9, 2017, which claims the benefit of French Application No. 1655527, filed Jun. 15, 2016, which are incorporated by reference in their entirety.

FIELD OF THE INVENTION

The subject matter of the invention is a method for segmenting data at high efficiency, these data coming from so-called connected objects. The invention relates to the field of the transmission of data and more precisely relates to the processing of the data sent from such an object by means for transmitting more particularly in the radio-frequency domain.

Transmitting data between so-called connected objects is a branch of telecommunications referred to as IoT (the acronym for Internet of Things). The connected objects relate to any object in the broad sense, equipment or living body, monitored or assessed by a sensor (or a plurality of sensors) connected to means for sending the data supplied by this sensor or sensors and transmitted to receivers. The applications are many and relate to various domains: the environment (temperature, hygrometry, wind speed, gaseous composition, magnetic field, etc.), "intelligent city" equipment (monitoring of flow, public lighting, main energy metering, etc.), health (monitoring of heart rate, blood pressure, body temperature, etc.), home automation and industry (consumption of electricity, fluid levels, detection of fire, intrusions, etc.), or location (children, domestic animals, personal objects, etc.).

This technology of communication between transmitters and receivers has up until now used cellular communication networks such as the GSM network and its derivatives (GPRS, UMTS, LTE, etc.) and/or WiFi networks and/or cable networks (telephone network, specialised or local lines, etc.). However, the transmission rate of IoT transmissions is as a general rule only a few hundreds or a few thousands of bits per day, since the majority of transmissions from connected objects are limited to an isolated sending—for example an alert detecting that a measuring threshold has been exceeded—or a repeated sending, with a low frequency, of state or position data.

It has therefore quickly become apparent that the protocols used—both on cellular networks, such as the LTE or 4G protocol, and on cable networks—have a high energy consumption compared with the low rates of transmissions from connected objects. In order to minimise the electrical consumption of the connected objects and to preserve the autonomy of their energy sources while providing long-distance transmissions (up to a few tens of kilometres), low-rate data transport networks have been developed. These networks, designated by the acronyms LTN (low throughput network), or LPWAN (low power wide area network), use radio-frequency technologies, the hardware and software components of which are designed to minimise energy consumption. They function either in an ultra-narrow bandwidth (UNB) such as the Sigfox® network, or on the contrary by frequency spectrum spreading such as the LoRa® technology, typically on the 868 MHz band in Europe and 915 MHz in the United States.

These LTN/LPWAN transport networks are networks deployed on a local scale (for example on an industrial site) or a global scale (for example on the territory of a country). They consume little energy on transmission (typically 25 mW for the connected objects), and have a very low transmission rate (typically 100 bits/s) and a long range (up to several tens of kilometres in free field). Thus an IoT architecture consisting of LTN/LPWAN networks is particularized by a low rate, low consumption and excellent territorial coverage: for example, the 1500 base stations currently used by the Sigfox® network cover more than 90% of the French territory in outdoor use, and each base station is capable of connecting several hundreds of thousands of objects.

PRIOR ART

With such low-capacity networks, the size of the messages to be transmitted—once the data from the connected objects have been coded in the application layer—is usually incompatible with the low payload size of the packets in the transport network. To enable messages with a greater size than the payload to be transported, it has appeared necessary to divide up the data in the form of segments in the transport layer of the architecture. The segments are numbered and encapsulated with a header containing the service data to form packets. The access layer of the architecture routes the segments over the network.

Examples of IoT architecture are described in the patent documents WO 2011/157938 or WO 2001/58094. In such architectures, the connected objects transmit the packets via accesses to the network, which provides routing to a network controller consisting of one or more control servers dedicated to the delivery of the packets to the addressees.

The packets are transmitted to the addressee, which may be another connected object, an item of equipment or a server. The network controller in particular carries out pre-processing of the packets in order to eliminate duplicates resulting from routing via different base stations. Incomplete segments or ones not recognised by the protocol are deleted. Then the validated packets are transmitted to the addressee, where the segments are formatted in order to extract the data. Under these conditions, the duration of transmission may sometimes be very lengthy, up to several days.

A constraining defect appears when the connected objects are activated and communicate their data at substantially identical instants, causing data peaks. The network controller or the addressees are then overloaded, causing a complication in the management of the data, even in the case of the LTN/LPWAN networks, and this despite their sizing. To remedy this problem, it has been proposed to use a platform comprising essentially an enterprise bus known as ESB (the acronym for enterprise service bus) to serve as an interface between the gateways, the network and the receivers. Such a solution is described for example in the patent documents WO 2015/162225 or US 2012/109663.

However, despite these improvements, the low-rate networks recurrently exhibit uncertainty in the routing of the data which, with regard to the massive increase in the number of objects connected, becomes a major problem. At the same time, the increase in the traffic causes undesirable disturbance effects in the radio-frequency domain, which has the result of reducing the size of the acceptable payload of the packets in the network.

In addition, the authentication of the messages, which requires the addition of an authentication field and the possible enciphering of the messages by block, cause an increase in the size of these messages. This protection causes almost routine exceeding of the size of the payloads imposed by the network.

DISCLOSURE OF THE INVENTION

The problem therefore lies in the fact that it is impossible to transmit messages when the size of the data that they contain and/or their authentification and/or their enciphering cause the acceptable payload of the packets in the network to be exceeded, whereas dividing the messages into segments must remain compatible with the size of the packets. In addition, reconstituting the messages requires efficient sequencing to avoid alteration or loss thereof, in whole or in part, or proceeding with erroneous routing, and this over a long period of time that may extend over several days.

The invention proposes to overcome these problems by using a segmentation based on a temporal modulation of sending the packets according to their place in the message, combined with an optional reordering of the segments in order to reconstitute the message on arrival. Such a segmentation of the messages makes it possible to exceed the intrinsic capacity of the network, without loss of data and with high efficiency.

In this regard, the subject matter of the present invention is more precisely a method for reconstructing data sent from at least one connected object to an addressee via a transmission architecture consisting of at least a low-rate network, access to which is governed by metadata, and comprising the following successive steps of processing said data in bottom transmission layers of the architecture: encoding of the data as messages and initial division of each message into segments including a first segment followed, where applicable, by at least one intermediate segment, and by a last segment; encapsulation of each segment in a packet provided with a header; routing of the packets via base stations in at least one network in the architecture, and reconstitution of each message from the packets received and then transmission of each reconstituted message to the addressee.

In this method, the reconstitution of each message is based on a modulation of the sending of the packets constituting this message at successive time intervals defined by no more than four sending periods of specific durations, namely: a period dedicated to the sending of a last segment in the case of the division of a message into two segments, a first period between the first segment and the first or only intermediate segment in the case of the division of a message into more than two packets, a second period between an intermediate segment and the intermediate segment that follows it in the case of the division of a message into more than three segments, and a third period between one of the intermediate segments or the only intermediate segment and the last segment in the case of the division of a message into more than two segments.

Under these conditions, the identification of each segment—as the first segment, intermediate segment or last segment—and the order of the intermediate segments are determined without requiring coding the segments with personalized numbering that extends the header of the segment.

According to an alternative embodiment, in place of the dedicated period and the first sending period of specific duration for the message segments divided into more than two segments, the header of each packet includes a bit for distinguishing between the first segment and the other segments in order to identify this first segment, the number of periods of specific duration then being reduced to two, namely the second and third periods.

In the case where the messages may also be encoded in a single segment, the header of each packet includes at least one uniqueness bit for indicating whether the message contains only one or a plurality of segments.

According to a preferred embodiment, a sequencing check and where applicable a resequencing of the intermediate segments in their initial order of the messages of more than three segments are carried out using data relating the sending of the packets.

According to particular embodiments:
the sequencing check and where applicable the resequencing are carried out using timestamping carried out on each packet at the entry to the architecture by the connected object, a gateway for access to the network and/or at least one base station;
the sequencing check and where applicable the resequencing are carried out using an extraction of metadata from the bottom layers, such an extraction being able to relate for example to the identifiers of the connected objects associated with a frame counter, or to other parameters in relation to the sending of the packets and collected by the metadata.

According to advantageous embodiments:
the first segment of a message is sent only if a minimum period of specific duration between messages—referred to as the intermessage period—has elapsed as from the sending of the last segment of the previous message;
a validation of the segmentation of a message is carried out by checking the duration of the inter-message periods before and after the specific sending periods of said message, this validation locating any loss of segment in this message;
a validation of desegmentation of the messages is carried out using an integrity check field via a CRC (cyclic redundancy check) tool.

Advantageously, the invention makes it possible to function with dynamic maximum segment sizes and therefore to optimise the use of the radio-frequency parameters at every instant, which makes it possible to dispense with the traditional approach, which fixes these parameters for transmitting a payload of fixed size. The quality of the transmission and the efficiency are thus substantially improved, the transmission to the addressee being able to be synchronous or asynchronous between the connected object and the network and respectively between the network and the receiver.

According to other advantageous aspects:
after verification that the message to be constructed contains more than one segment, each packet in this message is stored for a validity period of given duration;
the reconstitution of the initial message is done by concatenation of the payloads contained in the segments after checking of their sequencing and resequencing where applicable;
the check on sequencing of the segments accompanied where applicable with the resequencing, the validation of segmentation of the messages and the transmission of the reconstituted messages to the addressees are carried out by at least one segment-processing server, which can be chosen between at least one control server of a network controller and/or at least one processing server of the independent architecture of the network or networks. In particular, the functions of validation of segmentation of the messages and of sequencing-resequencing can respectively be implemented by a segment-processing server independent of the network or networks.

Advantageously, the invention makes it possible to extend the field of application of the networks for transmissions by timestamped packets with small bandwidth and low energy consumption by the transmission of more bulky data that is in principle not allowed by the network and/or transmission of secure data, in a context of transmission at low energy, with a very long durability of operations.

PRESENTATION OF THE FIGURES

Figure 2:
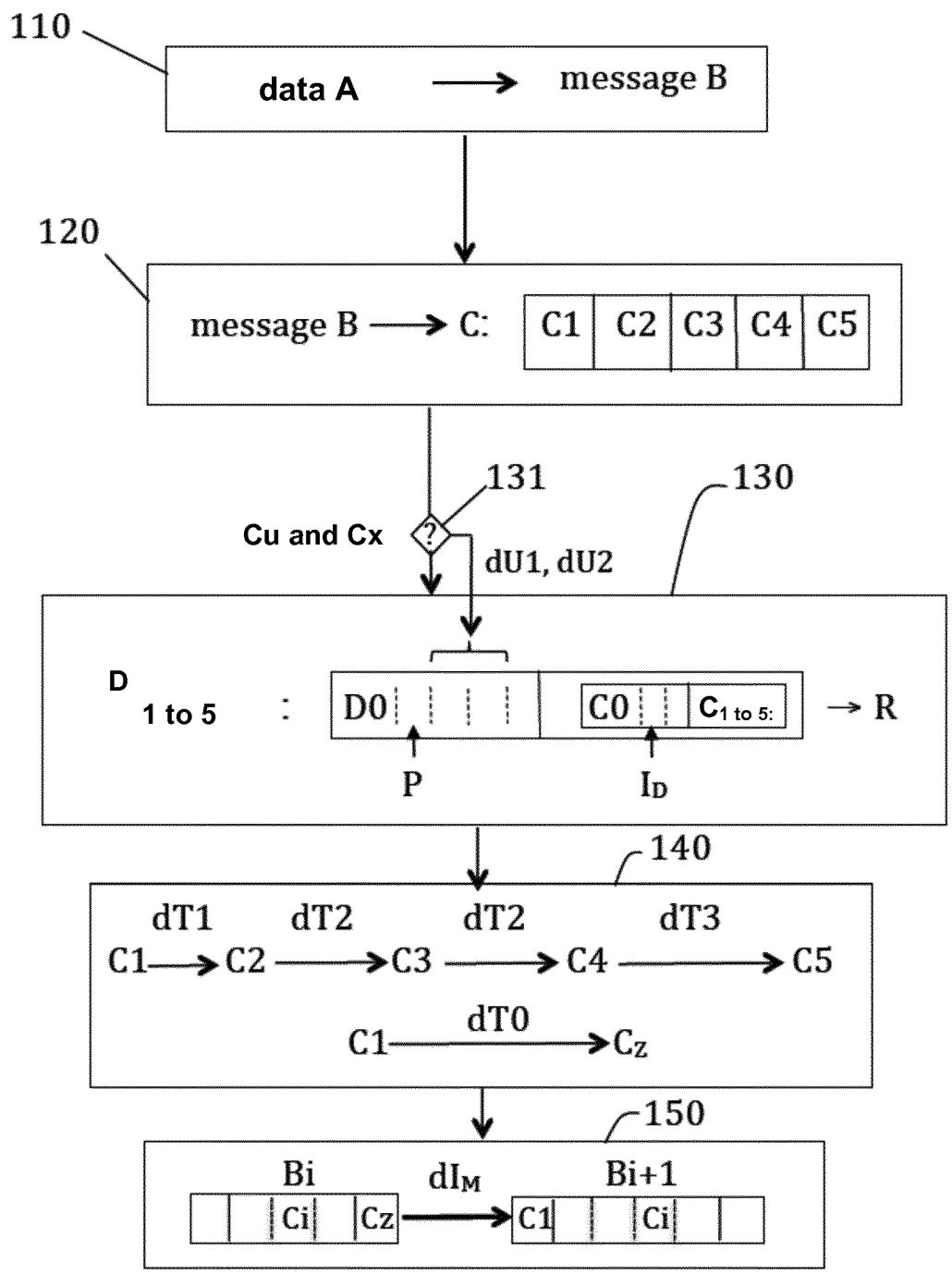
Figure 3:
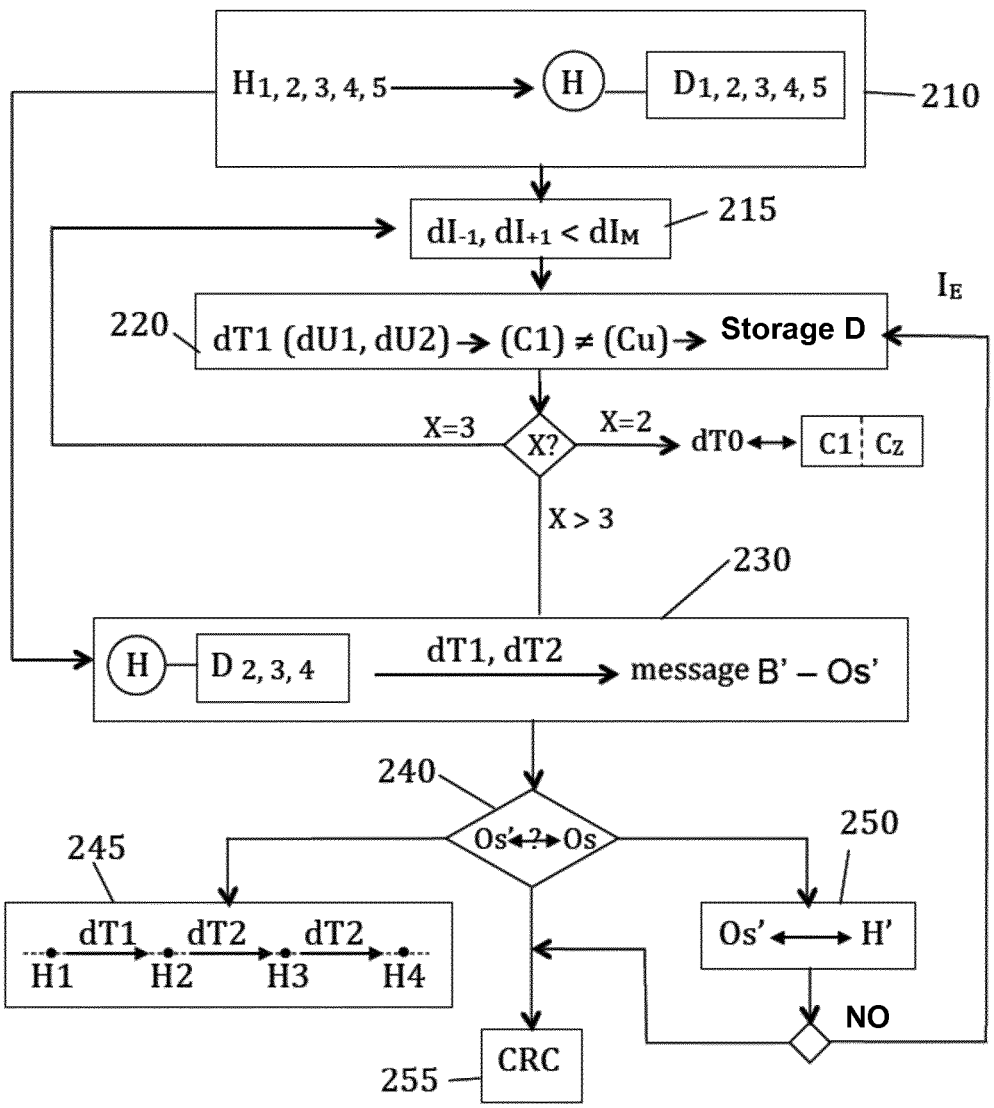

Other features and advantages of the invention will emerge from a reading of the following description that relates to detailed example embodiments with reference to the accompanying figures, which show, respectively:

FIG. 1, a schematic example of IoT architecture of radio-frequency message transmission according to the invention between a connected object and a receiver via a low-rate network;

FIG. 2, a diagram comprising the main steps of processing the data during the transmission of a message in the architecture example of FIG. 1, and FIG. 3, the main steps of validation of segmentation and desegmentation of the packets of the message to be transmitted from the network as far as the addressee.

DETAILED DESCRIPTION OF EXAMPLE EMBODIMENTS

The schematic example of IoT architecture 1, for the radio-frequency transmission of messages according to FIG. 1, comprises a low-rate LTN/LPWAN network 10 using a protocol suited to this type of network. Data are produced periodically or at isolated moments by various items of equipment 11 to 13 with the same structure, a series of electrical consumption readings of groups of buildings in the example, are encoded in the form of messages and then sent in the form of segments encapsulated in packets—via a connecting gateway 2a or directly by their antenna 2b—to the base stations 3 of the network 10.

Advantageously, a plurality of networks may be used according to the protocol or protocols used. Other data come from a server 14 and are also transmitted directly to the network 10 via its antenna 2c. The base stations 3 of the network 10 cover the space between the sending equipment 11 to 14 and the addressee receivers 21 to 23.

The items of equipment 11 to 14 constitute the connected objects of this example embodiment. They have an internal clock (not shown) so as to be able to transmit at given instants, in accordance with a known precision.

The messages are next conveyed by the network 10 to the respective addressee receivers 21, 22, 23 via the base stations 3 in the network 10, which effect timestamping, detailed below, and transmit the data to a control server 4 of the network 10, which eliminates the message duplicates. The addressee receivers are here an invoicing centre 21, database 22 and a recorder 23.

The processing of the data as far received by the network 10 is carried out with the protocol used in the bottom layers of the architecture in accordance with steps 110 to 150, in accordance with the example diagram in FIG. 2. In each connected object or, where applicable, each connecting gateway 2a, any data item or set of data relating to raw information "A" are first of all encoded in the form of a message "B" in the "presentation" layer of the network communication system (encoding step 110), and then the message is divided into segments in the "transport" layer (division step 120), here into five segments C1 to C5

The number of segments depends on the maximum transmissible size, which results from the processing capacity of the bottom layers of the architecture. When a mechanism of automatic retransmission of the segments is integrated in the processing layers, or when the maximum transmissible size is caused to vary for any other reason (redefinition of the architecture, change of network, changes in dynamic radio parameters ADR (acronym for "adaptive data rate") controlled by the control server 4, etc.), the size of the segments is recalculated dynamically, that is to say directly by a dedicated management mechanism, before transmission thereof.

In these cases of variation in the maximum size of the segments, a message desegmentation validation is carried out in the "transport" layer of the communication system of the network, as will be described with reference to FIG. 3.

Each segment "C", C1 to C5, is next encapsulated in a packet, respectively five packets D1 to D5 in the example (encapsulation step 130). In this step 130, each packet "D", D1 to D5, provided with a header D0 containing the address "P" of the connected equipment (with the bottom connecting layer added) is conveyed to the addressee receivers 21 to 23, via the stations 3, the control server 4 and, in the example, two processing servers integrated in the architecture 1 independently of the network 10, a so-called segmentation server 5a and a so-called sequencing server 5b (cf. FIG. 1). Each addressee receiver "R", here the invoicing centre 21, is identified by a network application connected to the control server 4.

The packets D (D1 to D5)—containing successively the first segment C and then the intermediate segments Ci (C2 to C4) and finally the last segment $C_Z$ (C5 in the example))—are then sent consecutively in three sending periods of specific durations, the second dT2 (of duration equal to 20 seconds in the example) strictly longer than the first dT1 (with a duration equal to 13 seconds in the example) and the third dT3 (with a duration equal to 27 seconds in the example) strictly longer than the second dT2, these periods being respectively applied as follows (step 140):

the first period dT1 for sending the first intermediate segment C2 (via the packet D2) with reference to the instant of sending of a first segment C1, makes it possible to identify the first two segments;

the second sending period dT2 identifies the following intermediate segments, here the segments C3 and C4 (via the packet D3 and D4), and the third period dT3 for sending the last segment (via the packet D4) with reference to the sending of the intermediate segment that precedes, here C4, makes it possible to identify C3 as the last segment.

Under these conditions, the segment C1 is identified as the first segment, the segments C2 to C4 as intermediate segments and C5 as the last segment in the example illustrated.

Alternatively a bit $I_D$ for distinguishing between the first and the other segments C2 to C5 is used in place of the first period dT1. This distinguishing bit $I_D$ is then integrated in a header C0 of each segment "C".

The identification of the segments by the modulation of the periods dT1, dT2 and dT3, or alternatively by the combination of the periods dT2, dT3 and of the distinguishing bit $I_D$, does not apply to the messages divided into only two segments. In this case, a period dT0 of duration of sending of a last segment $C_Z$—when its reference instant is the sending of a first segment C1—is defined as a specific period modulation according to the invention. The segmentation of the messages into two segments is thus directly validated.

In the case where the messages can be encoded in the form of a single segment $C_u$, or a plurality of segments $C_X$ (decision step 131, which supplements step 130), a single segment bit dU1 referred to as a uniqueness bit, may advantageously be added to the header of the packets "D" in order to distinguish the messages encoded in a single segment from the other messages. And the addition of a second supplementary bit dU2 allows a more complete distinguishing between a single segment $C_u$, an intermediate segment C2, C3 or C4 in the example, and a last segment, C5 in the example.

Advantageously, when the message contains more than three segments, the third sending period dT3 is longer than the second dT2 in order to make the last segment, here C5, secure in its identification as the last segment. This is because the sending of the last segment requires a longer period for ensuring that no other segment follows this segment in question as the last.

In order to differentiate the messages corresponding to the successive sending of data by the same item of equipment, it is advantageous to apply a minimum period of specific duration (for example 29 seconds) referred to as "intermessage" $dI_M$ (separation step 150) between the sending of a last segment $C_Z$ of a message $B_i$ and the first segment C1 of the message $B_{i+1}$ that follows it in time. This minimum inter-message period $dI_M$ is used hereinafter to validate the segmentation of the messages by the segmentation server 5a in the example, and thus locate the segment losses.

The diagram in FIG. 3 illustrates more particularly, during the routeing of the packets D1 to D5 from the network 10 to the addressee receiver, the invoicing centre 21 in the example embodiment (cf. FIG. 1), the segmentation validation and sequencing steps carried out on each message.

So that the sequencing step can be implemented, a base station 3 is equipped with a timestamper that tags a timestamping print "H", H1 to H5 in the example, on each packet D1 to D5 of the message "B" (timestamping step 210). In other example embodiments, the connected object 11 to 14 and/or the connecting gateway 2a are also or alternatively equipped with a timestamper. This timestamping will allow a verification of sequencing of the segments at the sequencing server 5b in the example, after validation of the segmentation. In the event of error, resequencing is carried out, as detailed below. A reconstitution of the initial message "B" by concatenation of the payloads contained in the packets D1 to D5 is finally carried out, in the example, at the server 5b from the segments validated in their segmentation and then in their sequencing.

The transmission between the connected equipment 11 to 14 and the base station being synchronous and then asynchronous between the base station 3 and the control server 4 (cf. FIG. 1), a plurality of segments of various messages are liable to be received almost simultaneously in partial overlap by the control server 4 from one or more base stations 3. An analysis of timestamping then makes it possible to locate such overlaps and where applicable to carry out deduplication by the control server 4.

Alternatively to the timestamping, the verification of sequencing, any resequencing and deduplication are carried using an extraction of metadata from the bottom layers. Such an extraction relates to the identifiers supplied by the MAC addresses of the connected objects 11 to 14 associated with a frame counter, or other parameters: marking of sending of packets recorded in the metadata or other information elements (delay, disturbance, modification of payload, etc) collected by the metadata in relation to the sending of the packets.

Independently of the timestamping, controlling the separation between the messages makes it possible to validate the segmentation of each message "B" of more than two segments from the minimum intermessage period $dI_M$ between the messages coming from the same equipment (cf. separation step 150 described above).

To do this, the validation of segmentation of the message "B" (reconstruction step 215) is carried out by the segmentation server 5a by comparing the duration of these specific periods $dI_{-1}$ and $dI_{+1}$, respectively preceding and following the specific periods dT1 to dT3 of the segments C1 to C5 of said message "B", and the minimum inter-message period $dI_M$. If at least one of the periods $dI_{-1}$ and $dI_{+1}$ is less than $dI_M$, this reconstitution of the message then makes it possible to locate a loss of segment. Such a loss may have various causes: duplicates (a connected object may send its packets several times, which may be received by several base stations 3), packets from "unknown" objects (coming for example from another operator), etc. If the periods $dI_{-1}$ and $dI_{+1}$ are at least equal to $dI_M$, the segmentation is considered to be complete and the message "B" reconstructed.

Furthermore, the first specific period dT1 (or alternatively the distinguishing bit $I_D$) and, where applicable, the supplementary bits dU1 and/or dU2 make it possible (cf. step 130), by means of the header D0 of the packets "D", to differentiate the messages with a plurality of packets from the messages with a single packet "$D_u$" through a differentiated identification between a segment "C" of messages with multiple segments and the single segment $C_u$ of messages with a single segment.

Consequently, if the header of a packet "D" indicates, by the first specific period dT1 (or by at least the supplementary bit or bits dU1 and dU2), that the first encapsulated segment C1 in this packet is not a single segment $C_u$, this packet "D" is advantageously stored in the segmentation server 5a (storage step 220), independently of its processing, for a validity period, 24 hours in the example embodiment. Validity periods with a substantially longer duration, potentially very long (for example one year) may be defined if the base stations can be deprived of their connection over such long periods.

The segmentation validation in the case where the message "B" is divided into two segments C1 and $C_Z$ (x=2) is distinguished by the specific period dT0 (cf. step 140). When the number "X" of segments Cx of an initial message "B" is equal to three, the segmentation validation is carried out by the reconstruction of the messages from the minimum intermessage period $dI_M$ (cf. reconstruction step 215), since the sequencing of verification does not apply with only one intermediate segment.

When the number "x" of segments is greater than three (segmentation validation step 230), such as the five segments C1 to C5 of the example, the segmentation validation is controlled at the segmentation server by a message reconstruction (cf. reconstruction step 215) from the periods of specific durations dT1 and dT2 and with reference to the timestampings H2 to H4 of the intermediate packets D2 to D4 (correlation step 240). This temporal "correlation" makes it possible to check the sequencing of the segments of the message to be reconstituted "B" after concatenation and, where applicable, to carry out a resequencing of the intermediate segments, as detailed below.

The verification of this correlation consists of comparing the restored sequencing Os' and the initial sequencing Os (correspondence block 240). When the sequencings are concordant (correspondence step 254), the timestamping H2 is fixed substantially after the specific duration dT1, taking H1 as a reference, and the timestampings H3 and H4 are deduced substantially from the simple and double succession of the specific period dT2, taking H2 as the timestamping reference. Thus the verification of message sequencing in principle restores the initial sequencing of the segments of the initial message "B".

In the case where the restored sequencing Os' of the segments does not correspond to the initial sequencing Os (resequencing step 250), the sequencing Os' is applied to the timestamping "H"' of the segments of other messages intended for the same invoicing centre 21 (referenced by the network application) and coming from the same connected equipment 11 to 13 (referenced by their address P) in order the check whether a "correlation" and therefore a resequencing is possible.

If no correlation between the sequencing Os' and the timestampings "H" of the segments of the various messages is obtained, an error code $I_E$ is transmitted to the addressee server 21 and the sequencing server 5b (cf. FIG. 1) stores the reconstituted message "B" with this error code (return arrow "NO"). The headers of the message segments "B" are next compared with the headers of the other erroneous messages already stored, and along with subsequent storages, in order to be able to subsequently resequence the messages from the erroneous messages.

In the case of absence of partial or total correlation, a desegmentation validation (integrity step 255) is also implemented in an integrity check field. A CRC tool is integrated in order to carry out the tests of various possible combinations of segments of various messages having similarities with, as a validation criterion, the integrity field.

A desegmentation validation is particularly suitable when the bottom communication layers integrate a mechanism of automatic retransmission of the segments and/or a variation in the maximum transmissible size, the size of the segments to be transmitted being calculated dynamically before their (re)sending. The identification of the segment to be transmitted can then be modified at any instant and the specific sending period to be applied to a segment can change from one specific sending period to another just before the sending of this segment.

The invention is not limited to the examples described or depicted. It is for example possible to use more than two specific segment sending periods, in particular when the messages are large, in order to differentiate the first from the blocks of intermediate segments and the last segment of the messages.

In addition, the steps of sequencing-verification (and then resequencing where applicable), segmentation and transmission to the addressees may be implemented by at least one segment-processing server, in particular one or more independent servers, such as the servers 5a and 5b in the example, and/or one or more network control servers, such as the server 4 of the controller of the network 10.

Moreover, it is also possible to use a plurality of low-rate networks in order to distribute the load over a plurality of networks, which improves the efficiency of the transmissions. In this case, the use of one or more independent servers may be particularly useful in order to verify the sequencing and segmentation of the messages. This is because the sending or transmission of identical messages resent (causing a multiplication of duplicates), the risks of loss of segments or other disturbances by interference between the transmissions are substantially increased in the case of an architecture covering at least two networks.

What is claimed is:

1. A method for transmitting data sent from at least one connected object to an addressee via a transmission architecture comprising at least one low-rate network, wherein access to the at least one low-rate network is governed by metadata, the method comprising:
   encoding the data as messages;
   dividing each of the messages into a plurality of segments comprising a first segment, at least one intermediate segment, and a last segment;
   encapsulating each segment of the plurality of segments in a packet associated with a header to generate a plurality of packets;
   routing the plurality of packets via base stations in the at least one low-rate network in the transmission architecture;
   reconstructing each of the messages from the plurality of packets received to generate reconstituted messages; and
   transmitting each of the reconstituted messages to the addressee from a control server, wherein the reconstructing of each of the messages is based on a modulation of sending the plurality of packets of each of the messages at successive time intervals defined by four or less sending periods of specific durations, the four or less sending periods comprising one or more of:
   a period for sending the last segment responsive to division of a message into two segments;
   a first period between the first segment and a first intermediate segment responsive to division of the message into more than two segments;
   a second period between a second intermediate segment and a third intermediate segment that follows the second intermediate segment responsive to division of the message into more than three segments; or
   a third period between a fourth intermediate segment and the last segment responsive to division of the message into more than two segments.

2. The method of claim 1, wherein the header of each of the plurality of packets comprises a bit for distinguishing between the first segment and other segments in order to identify the first segment, wherein a number of periods of specific duration are reduced to two periods, wherein the two periods are the second period and the third period.

3. The method of claim 1, wherein responsive to the messages being encoded in a single segment, the header of each of the plurality of packets comprises at least one uniqueness bit for indicating whether the message contains a single segment or at least two segments.

4. The method of claim 1, wherein a sequencing verification and resequencing of one or more intermediate segments to an initial order of each of the messages that has more than three segments are carried out using first data corresponding to sending the plurality of packets.

5. The method of claim 4, wherein the sequencing verification and the resequencing are carried out using timestamping of each of the plurality of packets at entry to the transmission architecture by one or more of the at least one connected object, a gateway for access to the at least one low-rate network or at least one base station.

6. The method of claim 4, wherein the sequencing verification and the resequencing are carried out using an extraction of metadata of bottom layers of the transmission architecture.

7. The method of claim 1, wherein the first segment of a second message to follow a first message is sent responsive to a minimum inter-message period of specific duration between messages having elapsed subsequent to sending the last segment of the first message.

8. The method of claim 7, wherein a validation of segmentation of the message is carried out by checking duration of inter-message periods before and after specific sending periods of the message to locate any loss of segment in the message.

9. The method of claim 1, wherein a validation of desegmentation of the messages is carried out using an integrity check field via a cyclic redundancy (CRC) tool.

10. The method of claim 1, wherein subsequent to checking by the control server that the message to be reconstructed contains more than one segment, each packet of the message is stored for a validity period of given duration.

11. The method of claim 1, wherein the reconstructing of an initial message is carried out by concatenation of payloads contained in the plurality of segments subsequent to checking sequencing and resequencing of the plurality of segments.

12. The method of claim 8, wherein the validation of segmentation of the messages and checking of sequencing of the plurality of segments is accompanied by resequencing and the transmitting of the messages reconstructed by concatenation to the addressee are carried out by at least one segment-processing server comprising one or more of at least one control server of a network controller or at least one processing server of the transmission architecture of the at least one low-rate network.

13. The method of claim 12, wherein the validation of segmentation of the messages and the checking of sequencing and the resequencing of the plurality of segments are respectively implemented by the segment-processing server independent of the at least one low-rate network.

\* \* \* \* \*